United States Patent
Murthy et al.

(10) Patent No.: US 12,077,460 B2
(45) Date of Patent: Sep. 3, 2024

(54) APPARATUS AND METHOD FOR BIOFILM MANAGEMENT

(71) Applicant: NEWhub Holding Company, Herndon, VA (US)

(72) Inventors: Sudhir Murthy, Herndon, VA (US); Bernhard Wett, Innsbruck (AT)

(73) Assignee: NEWhub Holding Company

( * ) Notice: Subject to any disclaimer, the term of this patent is extended or adjusted under 35 U.S.C. 154(b) by 0 days.

(21) Appl. No.: 17/752,996

(22) Filed: May 25, 2022

(65) Prior Publication Data
US 2023/0382773 A1 Nov. 30, 2023

Related U.S. Application Data

(60) Provisional application No. 63/192,719, filed on May 25, 2021.

(51) Int. Cl.
*C02F 3/10* (2023.01)
*C02F 101/10* (2006.01)

(52) U.S. Cl.
CPC .............. *C02F 3/109* (2013.01); *C02F 3/106* (2013.01); *C02F 3/107* (2013.01); *C02F 3/108* (2013.01); *C02F 2101/10* (2013.01); *C02F 2305/06* (2013.01)

(58) Field of Classification Search
CPC .......... C02F 3/109; C02F 3/106; C02F 3/107; C02F 3/108; C02F 2101/10; C02F 2305/06
USPC ......................................................... 210/610
See application file for complete search history.

(56) References Cited

U.S. PATENT DOCUMENTS

| | | | |
|---|---|---|---|
| 5,167,840 A * | 12/1992 | Jaccarino | B01D 24/4621 210/275 |
| 8,318,008 B1 * | 11/2012 | Anderson | B01D 21/0012 210/195.3 |
| 9,670,083 B2 * | 6/2017 | Wett | C02F 3/28 |
| 2006/0124543 A1 * | 6/2006 | Pehrson | C02F 3/006 210/615 |
| 2018/0009687 A1 * | 1/2018 | Murthy | C02F 3/305 |
| 2019/0010069 A1 * | 1/2019 | Skardon | C02F 3/305 |
| 2019/0263696 A1 * | 8/2019 | Bott | C02F 9/00 |

\* cited by examiner

*Primary Examiner* — Ekandra S. Miller-Cruz
(74) *Attorney, Agent, or Firm* — Jose Cherson Weissbrot (57) ABSTRACT

The subject of this invention is to use beneficial reactive support media in the form of reactive support bases or stratums that provide structural or biochemical benefits to the growth or function (including agglutination) of biofilms. The functional aspect includes the provision of a polymeric, cellulosic or silicic framework. The framework could also contain charge moieties such as cations, anions, amines or carboxyl groups whose pKa's allow them to be charged at the physiological pH for an organism. For example, a cation may provide a positive charge to help the adherence of a negative charge exocellular polymeric substance. The reactive support media may include biodegradable or refractory plastics, alginates or uronic acids or extracted bacterial EPS. These materials are reacted, retained or removed based on their physical characteristics.

14 Claims, 8 Drawing Sheets

APPARATUS AND METHOD FOR BIOFILM MANAGEMENT

CROSS REFERENCE TO RELATED APPLICATION

This application is entitled to, and hereby claims, priority under 35 U.S.C. § 119(e) to U.S. Provisional Patent Application No. 63/192,719, filed May 25, 2021, titled "Apparatus and Method for Biofilm Management in Water Systems," the disclosure of which is hereby incorporated herein by reference in its entirety.

TECHNICAL FIELD

The present disclosure relates to methods and apparatuses involving reactive biofilms, including its manufacture, addition to a system, its maintenance in the system using physical forces, its removal using same or different physical forces, its replacement in the system, and its residual reuse within downstream systems. The system is any concept that uses water and microbiology including but not limited to manufacturing processes and any contained apparatus, drinking water production processes and any contained apparatus and water reclamation processes and any contained apparatus.

BACKGROUND

Biofilms have been used in biological reactors, reactions, processes such as wastewater treatment for over one hundred years in many forms. These include suspended growth (many different types of activated sludge), fixed media such as trickling filter in separate systems, and rigid or flexible plastic fixed biofilm support media in Integrated Fixed Film Activated Sludge (IFAS) systems (hybrid systems). Biofilms are also found moving on media in separate Moving Bed Biofilm Reactors (MBBR) and hybrid IFAS systems. These also include synthetic material like sponges or hard plastic carriers. More recently, biofilm support media have been developed with gas addition in the annulus, such as Membrane Aerated Biofilm Reactors (MABR). These biofilm support media are reactive using gases that provide a reactant to the microorganisms that comprise the biofilms. These reactive biofilms use membrane permeable gases to improve the rates of reactions or to improve the energy efficiency of such reactions. A substrate or electron acceptor is fed to support such reactions. While these MABR systems are indeed reactive using gases, they are very difficult to implement because of the cumbersome support systems needed. Finally, the newest advent is a system of using mobile biofilms and immobilized bacteria in biofilms and the use of such organisms can support biological reactions, including in wastewater treatment.

There remains a need to develop and/or manufacture structural reactive support media for biofilms and to then employ the physical characteristics that promote its use, its reactions, its selection and its removal.

SUMMARY

Present invention provides reactive support media for biofilms for any system or process (including industries and waste/wastewater systems) that provide the substrates or nutrients (including micronutrients) in the solid phase, and that help grow and select for microorganisms or their functions (such as enzymatic reaction rates, agglutination function, etc.), where solids phase support media are used to host or deposit a reactant (by baking, coating, caking, sedimenting, impregnating or by any other means), or as a whole structural reactive particle biofilm support that enhance biological reactions or process functions in activated sludge processes or in the downstream processing of the wasted sludge or discharged effluent. The support media for the solid phase deposition of a reactant as aforementioned could themselves be reactive or have thermal properties or inductive properties (such as using metals for induction heating). The structural biofilm support can be three dimensional (3D) printed as a part of a distributed or decentralized manufacturing process (using any polymers or substrates including biodegradable types). Other organic or inorganic substrates for printing can also be considered. This printing can include simultaneous or sub sequential deposition or inclusion of other reactants on surfaces or within micropores. Any of these manufacturing processes can involve the inclusion of air bubbles, pores or cavities to create any volume or shape including media or synthetic biodegradable sponges. The approach of replacement of these stratums or support media (upon exhaustion or sufficient exhaustion) is conceived including using replacement cartridges or modules or cassettes or cages or any form of replacement structure.

By being reactive and more specific to the desired microbiology, there is a tremendous potential to improve the treatment performance. Thus, the opportunity is to: 1 add reactivity to a support or have the support be made of a material that is reactive, 2) add the structural reactive support to a process or reactor for biological growth or treatment, 3) the structural reactive support promotes the growth of certain microorganisms or confers morphological attributes, 4) the bacteria have desired physiology or function essential for treatment within the activated sludge process or in downstream processes where they may migrate, 5) the treatment process has a more active inventory of desirable functionality, or 6) the treatment process has higher efficiency or can be operated at higher rates (intensification).

The reactivity conferred on the support is essential to confer function and the separation of the structural reactive support and modulating the amount retained or optionally sent to downstream process is managed based on reactivity maintained.

The structural reactive support media form the core or otherwise integrated in the biological material. The biological material could alternatively be included (within inclusions) within the structural reactive support. Higher active fractions of desired microorganisms result in improved performance of the reactor or process.

A support can be optionally first selected based on its specific gravity, charge, hydrophobicity, size, shear, compressibility or specific surface area. Additional reactivity can be added to appropriately change the specific gravity, charge, hydrophobicity or size. The reactivity could be baked in or soaked in or using any other approaches and then it is ready to be mixed into the biological process where it confers its attributes and overall reactivity. The essential element is the reactivity of the support and the retention or removal of the support over time through modulating the efficiency or its retention or removal.

The support is mixed into the biological reactor or process by either dropping it directly into a tank, or by adding it in a mixing tank containing the activated sludge or wastewater. Over time, small amounts of structural reactive support are added intermittently or continuously, and small amounts are removed in the waste or effluent intermittently or continuously. The material in the waste or effluent are beneficial in the downstream process, and the amount of Residual reactant may, if necessary, need to support these reactions.

The structural reactive support media can be used in water reclamation, water treatment or water reuse where biological treatment is used to remove constituent. It can be used for industrial wastewater treatment. It can be used in any industrial or pharmaceutical manufacturing process. The support media can be used for manufacturing during treatment, for example, the invention can produce and help in the removal of products such as struvite, brushite, hydroxyapatite or any other chemical or element within a treatment process. Other products are also possible. It could help with growing products such as cultured microorganisms or enzymes or cofactors.

The present disclosure is further described in the detailed description that follows.

DETAILED DESCRIPTION

The subject of the invention is the purposeful use of structural reactive biofilm support as a whole or as stratums (collectively called either stratum or base stratum) that improve 1) the rate of reaction of biological processes or 2) any other function such as agglutination or diffusion, 3) preferentially select for certain organisms over others (similar to plating of specific organisms on agar but doing so in activated sludge) using inhibitor and/or growth promoters and 4) providing morphological characteristics (size, density, compression, viscosity, etc.) that allow for their physical retention and/or physical removal when exhausted or sufficiently exhausted of their reactants such as based on their physical properties, such as size, specific gravity, shear or compressibility. This invention also supports the continued use of these structural reactive support stratum (support or stratum are used interchangeably) once discharged in the reactor waste stream or in the effluent, as the stratum moves through solids processing to improve chemical recovery processes (such as struvite, vivianite, brushite, hydroxyapatite) by for example providing suitable nucleation, deposition or reactivity sites, digestion processes by providing alkalinity or any other reactant (including cations, anions or oxidant or reductant), fermentation (such as acid or alkaline fermentation) processes, neutralization processes (acid or bases released) or dewatering processes (improve or decrease water holding capacity of biofilms through divalent cation bridging, or by removing water holding phosphates, or by providing physical structure (including and not limited to chemical influences such as charge, and physical forces such as hydrophobicity, Van der Waals force, etc.) for enhanced mechanical dewatering). Counter diffusion of substrates is possible to encourage the bacteria to seek internal substrates, thus growing inwards rather than creating filaments seeking substrates outwards.

One final aspect of this invention is the use of silicic support bases or stratums that can be discharged in the effluent once the overlayer structural reactive strata is consumed, where the silicic support is used to grow beneficial diatoms as a treatment byproduct. In one option associated with this aspect of this invention, these silicic support stratums are discharged as nanoparticles or microparticles to help with their absorption into the diatom or other organism analog's cell wall material. One additional option is to use a selection device to arbiter the overflow or discharge of these material as needed to grow the downstream beneficial freshwater or marine diatoms.

The structural reactive support media can be media that is made of any material including plastic (preferably biodegradable), inerts, Styrofoam, organic, fabrics, etc. of any shape or dimensions, with the reactive agent coated or inside the support, that slowly is released through approaches such as dissolution, disintegration or it comes out. The support itself can be consumed if desired.

One important and crucial example embodiment is to make the media from any biodegradable plastic (including from 3D printed shapes). Biodegradable plastics are becoming an important material for manufacture of consumer goods and a route for its disposition is needed. There is soon likely to be a large supply of such plastics available as a solids phase carbon or nutrient source for micro-organisms. While the biology of such reactions are already a subject of interest, this embodiment considers the physical characteristics or factors crucial for the use of such plastics within reactors and systems, including the active surface area to volume ratio (also called specific surface area) for reactions (such as between 10 and 1000 m2/m3 or greater), the porosity, shape factors, air bubbles to manage physical characteristics, the size and specific gravity. For example, structural media may range in size from 0.1 to 1.0 mm or greater, with a coefficient of uniformity of 1.1 to 1.7 and a variety of shape factors from 0.1 to 1, and porosity of 0.2 to 0.9. Another approach is to have these structural media converted into biodegradable textiles or sponges, with periodic replacement or removal of these material upon sufficient or full exhaustion. Another approach is to have optical property to transmit light inside the structural media for use to grow organisms or for photoreactivity.

The inclusion of weighting material, heating material (such as heat wires, heat tapes, heating gases, heating liquids) or inductive material (such as metals) to change the physical, chemical or thermal properties of these plastics are also considered for both its maintenance and operation within a reactor or system, but also for its physical selection or removal (such as using a size, shear, compressibility or density separator, including but not limited to screens, filters, hydrocyclones, classifiers. Lamella, settlers, floatation device, upflow device, airlift device, etc.) from the reactor or system. The use of activated carbon or activated silica or any other support media are also a subject of the invention. Any biodegradable plastic can be used including but not limited to bio-based plastics. The blend of precursors of biodegradable particles to be selected to control the physical and chemical characteristics of the carbon released, or its fractional composition. The precursors or polymers used for production could be (and not limited to) as follows: polyhydroxyalkanoates (PHAs), polylactic acid (PLA), starch blends, cellulose-based plastic, lignin-based polymer composites, petroleum-based plastics, polyglycolic acid (PGA), polybutylene succinate (PBS), polycaprolactone (PCL), poly(vinyl alcohol) (PVA, PVOH), or polybutylene adipate terephthalate (PBAT). Blends of such plastics are also possible. These polymers can have enhanced or reduced reactivity for hydrolysis by increasing or decreasing surface area or any other biodegradation attribute. The degradation can also be influenced by heat, redox cycling (between anaerobic, anoxic or aerobic zones), physical shear, etc. Once mobilized and made labile, the carbon can be stored internally as storage products by the microorganism or used immediately or sent to a downstream or upstream process as needed.

Any reactor type can be used including any upflow or downflow filter, including but not limited to slow or rapid (using biodegradable plastics instead of say sand/anthracite) type filters; fluidized bed (e.g., downflow, upflow, hybrid), where the fluidizing velocity is selected to allow retention of the microparticle in the main vessel, hence proportional to the specific physical properties of the particle; packed bed (e.g., biofilter, tricking filter), where the particle size is selected to control system filter permeability to preferentially be >10 m3/m2 per hour, or preferentially be >1 m3/m2 per hour or preferentially be >0.1 m3/m2 per hour; mainstream or side-stream bioreactor (activated sludge, continuous flow, sequencing batch, batch or modified sequencing batch), alone or in combination with a separation vessel or device to increase the microbial concentration in the bioreactor as well as to recover the unused constituents of the growth media, with biomass concentration to preferably be >0.1% of the reactor volume or >1% of the reactor volume or >1% of the reactor volume, with the unused constituents of the growth media to be retained with an efficiency of >10%, or greater than 50%, or greater than 90%, or greater than 99%. A bioreactor may be used to bioaugment the concentration of the microbial population in the contaminated fluid treated in the mainstream to achieve a removal of the pollutant(s) or interest to be greater than 5%, greater than 50%, greater than 90%, greater than 99%, greater than 99.9%, greater than 99.99%. Other multifunctional reactor with biodegradable plastics or other stratums carrying out more functions simultaneously, namely: solid carbon source, support for biofilm growth, or filtering medium to promote separation/treatment. Optionally used is a treatment system with self-regulating particle characteristics, e.g. increase of carbon release due to particle size decrease (the particle release being proportional to surface which goes up as the particle decreases in size, as well as the biofilm area goes up as the particle decreases in size). In essence, the use of biodegradable particles induced a proliferation of bacteria proportional to the square of surface area, since both carbon dissolution and m2 of biofilm both depend on a m2 of particles that increases as particle gets smaller. Once the stratum is sufficiently or fully exhausted, it can be optionally physically removed through a selector or chemically reacted away. Any residual activity can be used in a downstream process favorably.

Material Specification for Structural Stratums:

Physical: Biodegradable plastics (or any other structural media materials) micronized to have most of the particles preferably between 10 and 10,000 um to provide support for biomass growth as well as carbon source to heterotrophic organisms or symbiotically supporting autotrophic bacteria, the particles being manufactured to potentially have one or more of the following properties: 1) the surface to volume ratio of the printed (as an option) particle of arbitrary shape to be greater than an equivalent sphere containing the particle of arbitrary shape, that is, greater than the following formula: $4*pi(\ )*r^2$ divided by $[4/3*pi(\ )*r3$ or, upon simplification, greater than $3/r$ where r is the radium of the sphere of minimal volume (hence minimal radius) fully containing the particle, 2) the terminal setting or floating velocity of the printed (as an option) particle, to be greater in absolute terms of the terminal velocity of an equivalent spherical particle that is, greater than the following formula: $2*r^2*(\rho-\sigma)*g$ divided by $9\eta$ where r is the equivalent radius diameter, $\rho$ is the density of the particle, $\sigma$ is the density of the fluid and g is the gravitational constant, 3) the hourly rate of carbon release of the printed particle (as an option) to enable denitrification, to be preferably greater than 10 mg carbon per mg of influent nitrate (per hour) or greater than 1 mg carbon per mg of influent nitrate (per hour) or 0.1 mg carbon per mg of influent nitrate (per hour), or any other rate below or above these rates, 4) the hourly rate of carbon release of the printed (as an option) particle to enable nitrification, to be preferably greater than 10 mg carbon per mg of influent ammonia (per hour) or greater than 1 mg carbon per mg of influent ammonia (per hour) or 0.1 mg carbon per mg of influent ammonia (per hour), 5 the hourly rate of carbon release of the printed particle to enable nitrification, to be preferably greater than 10 mg carbon per mg of influent orthophosphate, per hour or greater than 1 mg carbon per mg of influent orthophosphate or 0.1 mg carbon per mg of influent orthophosphate, 5) the hydraulic residence time of the printed (as an option) particle, to preferably be greater than 0.1 hour, greater than 1 hour, greater than 10 hours, greater than 100 hours or until the printer particles is fully dissolved, 6) the selective recovery of the printed (as an option) particle, to allow the printer particles to be preferentially recovered using attractive forces, repulsion forces, adhesion forces, electrostatic forces, the latter being augmented with materials selected to augment such forces (magnetite, iron particles, polar and non-polar substances, chemical surface modifiers)

The release of co-blended material purposely included in printed (as an option) particles to modify specific gravity, to be greater or lower than water by at least 5% but also many times that of water. The dissolution rate by induction or other forms of heating, to be greater of the standard dissolution rate at 20 C in tap water by at least 10%. The redox properties (for cycling of structural reactive stratums), to allow the development of redox-sensitive stratums and biofilms, and biomass with optimal growth condition between −600 to +300 mV, preferably greater than negative 600 mV, or greater than negative 60 mV, greater than negative 6 mV. Alternatively, redox properties could simply be classified as anaerobic, anoxic or aerobic. With redox properties being tuned or cycled using external energy or process conditions such as dissolved oxygen and temperature (from anoxic, anaerobic, aerobic) including using induced current controlled by induction systems or externally controlled via electrical and electromagnetic fields, light, pressure, shear, particle density, ORP/pH modifiers such as acid or base, etc. The separability by magnetic forces, enabled by the doping paramagnetic material in the particle, to be greater of at least 10% of the undoped particle. The release of micronutrients, enabled by doping micronutrients in the particle, to be greater by at least 10% of the micronutrient release of the undoped particle.

Biodegradable particles can contain chemical agents able to selectively growing biofilm with a specific microbial ecology on the particle, enabled by doping chemical agents in the particle such that the microbial population differs by at least 1% from the one growing on the undoped particle. Biodegradable particles can be manufactured with a 3D printer to optimize one or more of the physical properties indicated in the previous paragraph. Biodegradable particles selected from those with the unique characteristics of being degraded nearly completely (>50%) before leaving the treatment facility, hence with a degradation time (for 50% volume disappearance) to be lower particle retention time calculated from the point of addition of the particle until the location where the treated wastewater is discharged, this time being preferably shorter than 1 hour, shorter than 10 hours, shorter than 100 hours, shorter than 1,000 hours, shorter than 10,000 hours. Biodegradable particles to be used in combination of absorption (carbon-like) and ion-exchange (zeolite-like) material, either of natural or synthetic origin. The volume fraction of biodegradable plastics to be selected based on the initial pollutant concentration and the hydraulic retention time of the pollutants to be removed and the rate of release of carbon. For example, for biofilters intended to denitrify secondary effluent that are fully nitrified should contain at least 30% of biodegradable particles such as pelletized polycaprolactone with an empty bed contact time longer than 11.25 minutes, 22.5 minutes, or 45 minutes, or 90 minutes. With the remaining volume being occupied by other particles able to perform different process function such as granular activated carbon (to sequester organic micropollutants and chemical oxygen demand), zeolite (to sequester ammonia), with relative amount dictated by initial pollutant concentration targeted by the media. For example, 30% volume in granular activated carbon for 20 mg/L of COD in the influent or higher, 30% of zeolite for 0.1 mg/L of ammonia or higher, and the reminder filled with biodegradable particles of polycaprolactone.

The biodegradable particles used in conjunction of carbon-like or zeolite-like particle in a sequential order dictated by the influent characteristics, or uniformly blended together; preferably, with a layer of carbon-like particle at the end of the biofilter to degrade any unused carbon released by the biodegradable particles, with such final layer being at least 10% of the total volume of the biofilter.

These materials can be used alone or as blend, as well as augmented by selected chemical agents, as well as melted and re-molded as blend. Moreover, we can control the following factors to tailor their properties as ideal reactive medium for biofilm growth:

Chemical composition optimization can occur for these structured media in terms of resistance to biodegradation: n-alkanes>branched alkanes>low molecular weight aromatics>cyclic alkanes>high molecular weight aromatics=polar polymers.

These support media can be retained in modules or cages or cassettes or between screens or other devices. For example, the cassette can be replaced as needed partially or fully with new media if and when it is (sufficiently) exhausted. Whereas the replacement or regeneration of the cassette or cages hosting the media can also be informed by one or more sensors placed to detect the biofilm reactivity. The media can also become smaller and escape the cage (made of bars or mesh) and get wasted and have additional downstream reactivity. The cage itself can be as small as a 1 feet linear internal dimension (for example use in 20 ft or 40 ft containerized systems), to exceeding 100 feet linear internal dimension. The volumetric shape of the cage can be a cube, cuboid, sphere, capsule, star, or any other shape that enhances treatment efficiency and dispersal of reactant within a biofilm.

The reactive biofilm support in cassettes/cages can have a purposeful hydraulic flow regime of water or air, vertical to the cage (from top to bottom or bottom to top) or horizontal to the cage. The use of air or mixing to improve reactivity is envisioned by managing mass transfer considerations and the biofilm thickness.

In any case, any of these chemical reactive support media in activated sludge process can remain in a system or be removed using a physical selector device based on size, specific gravity or any other property such as compressibility, shear resistance, etc. The retention of these support media by a selector can be within (or internal to) the reactor (such as immersed cages with a mesh size), or using density (where the lighter material is surface wasted) or external to the reactor, in-line with the process or located with a waste stream. The selector can also be a hydrocyclone, screen, floatation, classifier or any other device that can be used as the support changes its composition and is ready for wasting. For example, the support (structural media surfaces) can initially be a size of 200 microns or a specific gravity (SG) of 1.05 and can be wasted when it becomes smaller (say 100 microns) or lighter (say SG=1.00). A change in particle size such as of 10 microns or of 100 microns or greater is conceived and a change in specific gravity such as of 0.05 g/mL or of 0.10 g/mL or greater is also conceived in this disclosure. Other specific gravity ranges and differences are also possible. One key aspect is to exploit the change in SG to the benefit of retention or removal. Same applies to size, viscosity, shear or other physical forces. The change in SG, size, viscosity or shear resistance is exploited to retain or remove. Thus, this allows a solids residence time management of the media and/or the biology that is grown on the media to any range value contained between say 1 day and 10,000 days (more typically between 1 day and 1000 days), or alternatively to a maximum of say less than 2 days, or less than 10 days, or less than 20 days, or less than 50 days, or less than 100 days or less than 1000 days or less than 10,000 days and so on. The exhausted media can be wasted or removed periodically based on SRT using the physical selection attributes/forces. The maintenance of these media in the tank can also be based on these physical attributes/forces. For the maintenance of these retained materials, the specific gravity or size of the material can also help with their ability to not be over buoyant or over heavy, thus allowing for improved mixing profiles and distribution within the reactor. Any size or specific gravity is possible of the material (inclusive or exclusive of the growth burden). For example, the specific gravity of the media/material without growth could be more or less dense (such as 0.9 or 1.2) compared to after accounting for growth on this media (such as 1.1).

To summarize, the subject of this invention is to use beneficial reactive support media in the form of reactive support bases or stratums that provide structural or biochemical benefits to the growth or function (including agglutination) of biofilms. The functional aspect includes the provision of a cellulosic or silicic (or silica gel, silicates, or silicic acid or other silicon-based granules or particles) framework. The framework could also contain charge moieties such as cations, anions, amines or carboxyl groups whose pKa's allow them to be charged at the physiological pH for an organism. For example, a cation may provide a positive charge to help the adherence of a negative charge exocellular polymeric substance. The reactive support media may include alginates or uronic acids or extracted bacterial EPS, for processes (such as a contact stabilization or A-stage reactor) that are EPS limiting.

Multiple layers are possible, including a base stratum consisting of for example a silicic or cellulosic or hemicellulosic or polysaccharides or carbohydrates (with or without amine or carboxyl moieties) material with coatings or impregnations of other chemicals including metal ions or natural or biodegradable polymers or metabolites that help with the biological function (intracellular or extracellular) of the organism. The base stratum material could be plant derived such as jute, wheat straw or any material derived from agriculture residue. As the overlayers are consumed, the support media are removed or discharged to the waste or effluent optionally through a selector approach based on gravity, compressibility, etc. These support media can continue to provide benefits in downstream processes until they are completely exhausted of their function to help the biology or otherwise the reactor operations that support such biology. The sufficiently exhausted reactive surfaces can be wasted or removed periodically based on SRT using the physical selection attributes. The maintenance of these media in the tank can also be based on these physical attributes.

Some possible coatings or reactive deposits include the use of any one or more of the following metals, including copper, aluminum, iron, molybdenum, cobalt, zinc, nickel, calcium, magnesium and potassium. Other metal ions or rare earths are also possible.

The use of metal in key metalloenzymes or metalloproteins. Any of the above metals can be used by bacteria for the making or translation of proteins. For example, copper is key metal in the synthesis of ammonia monooxygenase and methane monooxygenase. These enzymes oxidize ammonia and methane, respectively in key reactions involving such substrates. Similarly, molybdenum is needed for nitrogen fixing genes and iron is needed in cytochromes and in the heme protein of many reactions. Other metal micronutrients are also possible and are within the scope of this approach.

Metal ions or compounds are also sometimes needed for charge balancing. For example, magnesium and potassium balance the polyphosphate or ATP charge. Any of the above-mentioned metals (and their ions or compounds) can be used for such purpose of charge balancing and is a subject of this invention.

Metal ions can also sometimes be needed for charge bridging. It has been shown that the use of calcium and magnesium is key for divalent cation bridging of negative charge associated with bacteria or the extracellular polymeric substances (EPS) and the coatings or deposits of such metals can be productive in such bridging. Iron or aluminum is also a key metal in the neutralization or coagulation of such charge in a floc or granule complex. The use of such metal ions can improve the compact structure of the biofilms and reduce bound and interstitial water and can increase particle density by removing entrained water in the floc, biofilm or granule. Any of the above-mentioned metals can be used for such purpose of charge bridging and is a subject of this invention. This concept can fall into biological reactions associated with the extracellular matrix.

Metal ions can be used to change the contact angle associated with surface to address hydrophobicity and make the biofilm more hydrophilic as needed for adhesion and for binding. Any of the above-mentioned metals can be used for such purpose and is a subject of this invention. This concept can fall into biological reactions associated with the extracellular matrix. The exhausted reactive surfaces can be wasted or removed periodically based on SRT using the physical selection attributes. The maintenance of these media in the tank can also be based on these physical attributes.

The redox state of some of these metals can be adjusted to improve their reactivity using oxidative or reductive reactions or alternatively to make them more catalytic. In some cases, a reduced metal is needed for the desired reactivity or oxidative properties, and in other cases, the metals are desired in their oxidized state for the desired reactivity or reductive properties. The metals or their compounds can be used alone or incorporated into any other particles, including but not limited to activated carbon, ion exchange materials, resins, biochar from pyrolytic processes and their combination The use of organic substrates, metabolites, or surfaces for coatings or deposits are also possible. These substrates could be used directly as carbon sources under oligotrophic conditions such as for reuse or producing potable water or for the targeted purpose of cometabolism or degradation of micropollutants or refractory microconstituents such as cyclic or phenolic compounds, cyclic ethers, dioxanes, furans, etc. present in water. For example, these substrates may help produce the appropriate enzymes needed for the degradation of certain pollutants or their daughter metabolites. Organic material can also be used for their charge characteristics at physiologic pH. For example, the amine, amide, carboxyl or hydroxyl groups can confer positive or negative charge supporting extracellular reactions/biology. These groups could be associated with sugar, polysaccharides, proteins or glycoproteins including alginates and lectins. These organics could also include uronic acids. Other cationic, anionic or polar moieties can also be used. These extracellular charge or hydrophilic reactions can change the diffusion characteristics or the bound and interstitial water contained in the matrix that can support improved processing of the base stratum-biofilm complex. Such processing could include downstream crystallization, fermentation, digestion, stabilization, thickening or dewatering processes. In some cases where the organism is grown close to its maximum growth rate (near its log growth or just into its stationary phase), the organism may be flocculation limiting. In such cases, the supply of such compounds with negative charge, including bacterial or synthetic alginates or algins or uronic acids associated with base stratums could be useful for the extracellular matrix reactions and to promote flocculation.

The use of biological media is also possible, such as biologically reactive immobilized biofilms and their stratums. These biologically reactive media can be retained or excluded based on their physical characteristics such as specific gravity or size within for example gravity (including multiple times the forces associated with gravity) based, size based or shear/compressibility selection. The exhausted material can be wasted or removed periodically based on SRT using the physical selection attributes. The maintenance of these media in the tank can also be based on these physical attributes. Co-blending or pre-impregnation of selected strains of microorganisms or enzymes is also possible for any stratum.

The usages of inorganic minerals are also possible. For example, the use of silicic or inorganic carbon (such as carbonates) surfaces could encourage the build of rate limiting inorganics including for the production of beneficial diatoms that are part of the food web in both freshwater and saline ecosystems for combined grey-green treatment processes or for the use in downstream natural systems or constructed wetlands after the over-surface has been used in the activated sludge biology. These could be substrates for cell-walls or for chemoautotrophic processes. The use of graphene coatings are also contemplated for reactivity or for its physical characteristics.

Any of these above deposits could be applied as micro or nano particle deposits in a manner to improve lability or bioavailability within the bacteria. Processes could also be used to slow down the lability of the deposit or coating depending on the overall desired life of the coating or the base stratum. A mixture of chemicals within coatings could also be used. The coatings could also contain chelates or stabilizers as needed to help with desired reactivity.

The diameter of base stratums or surfaces can vary and could be as small as 10 microns and extend to 10,000 microns depending on purpose and downstream processing. The process of coating could involve mixing of an inert or near inert material in a pH adjusted solution followed by its filtering and drying. The coatings could include its reaction in an acid or base solution. The drying process could involve the use of heat or waste heat or heat exchangers or solar energy. The use of shakers and stirrers are also possible to improve reaction and mixing. The time constants associated with these steps could be as low as 30 minutes to 10 hours to over 24 hours in some cases. Baking processes could also be used.

The use of recovered material from wastewater or wastewater treatment can be very attractive. For example, fibers and cellulosic material is often a waste product and could be employed or redeployed by adding coatings to them or using these recovered materials such as alginates or alginate-like substances as coatings. A waste or recovered product of one process could become a valuable base surface or reactive stratum of another process and this exchange of material in beneficial ways is possible. For example, there is a significant amount of organic inerts that are generated from screening of influent wastewater or biological sludge. These screenings can be coated with beneficial material and redeployed. Alternatively, these materials could include precipitates or crystals that could be useful within the biological process after some processing including pulverizing, grading or reconstituting is done on them. For example, alginate-like substances from activated sludge granules could be reused in an A-stage or contact stabilization process to improve flocculation.

The reactive stratum approach can be applied to, or included with, any type of activated sludge reactor, including, for example, a bioreactor and a clarifier, a sequencing batch reactor, a modified sequencing batch reactor, an integrated fixed film activated sludge reactor, an upflow reactor with integrated clarifier or decanter, a membrane aerated biofilm reactor, or a membrane bioreactor. Fixed, moving or mobile media as biofilms can be used if desired in any reactor configuration. The modified sequencing batch reactor can include a single or multiple reactor tanks in series, in a step feed configuration, with at least two sequenced clarifiers. The upflow reactor can include feed piping located at the bottom of the reactor with an integrated clarifier or decanter at the top of the reactor. In the figures, if an inlet or outlet is not explicitly shown for a reactor or a clarifier, it needs to be assumed to have such inlet or outlet. The purpose of the figure is to show the key embodiment for performing selection.

Figure 1:
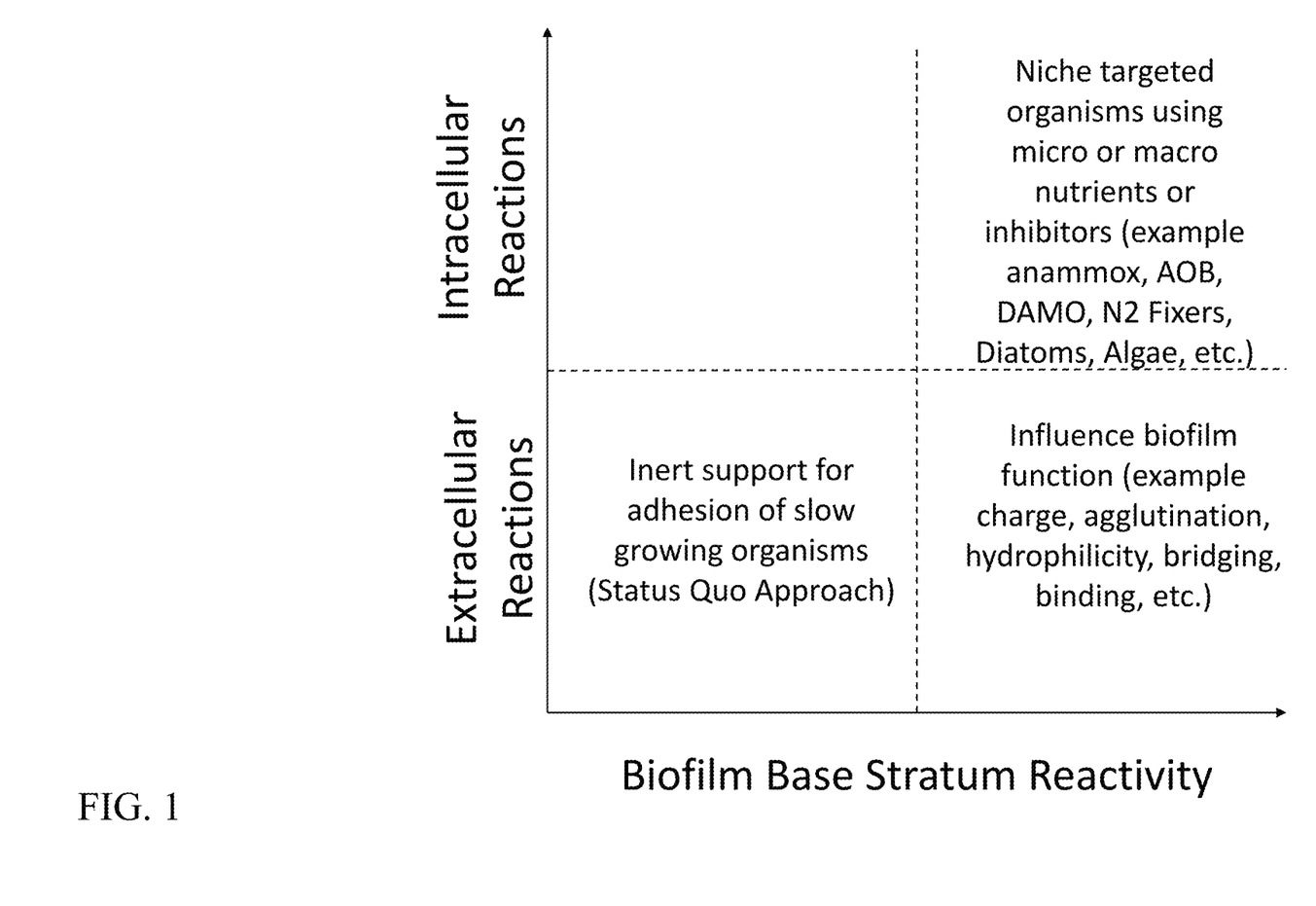
FIG. 1 depicts the conceptual representation of the influence of structural reactive biofilm base stratum reactivity in the bioreactions in the intracellular and/or extracellular matrix

FIG. 1 depicts the conceptual representation of the influence of reactive biofilm base stratum reactivity in the bioreactions in the intracellular and/or extracellular matrix. Thus, the stratum can influence not only the intracellular growth or function of specific organisms or groups, but also the extracellular matrix necessary for their habitation. These extracellular materials can have important morphological and physiological features from charge properties, relative hydrophilicity, to quorum sensing. These features can impact their performance in a reactor or process and also the physical selection of the organisms. Examples of intracellular effects include growth or performance of targeted organisms using micro or macro nutrients or inhibitors (example anammox, AOB, DAMO, nitrogen Fixers, Diatoms, Algae, etc.) in the reactive stratums. Examples of extracellular effects include influencing biofilm morphology or function (example charge, agglutination, hydrophilicity, bridging, binding, granulation, filaments, water holding capacity, etc.)

Figure 2A:
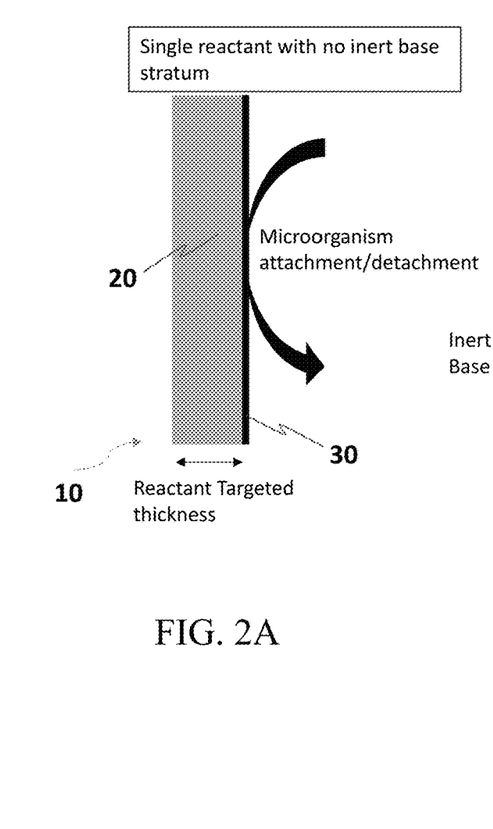
FIGS. 2A-2C depicts different layering approaches for biofilm base stratums including a monolayer and bilayer/multilayer.
Figure 2B:
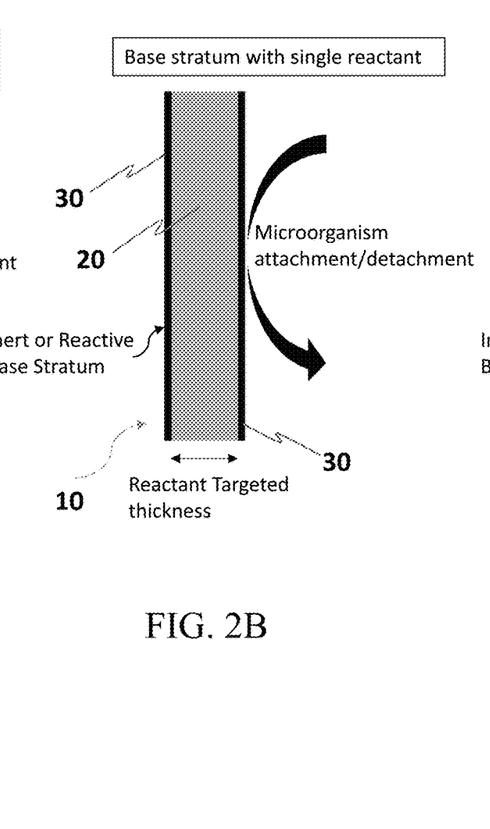
Figure 2C:
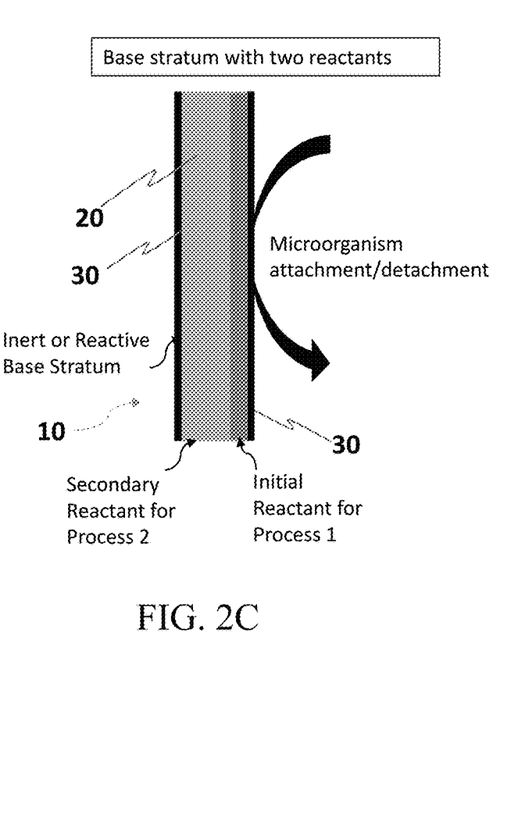
Figure 7:
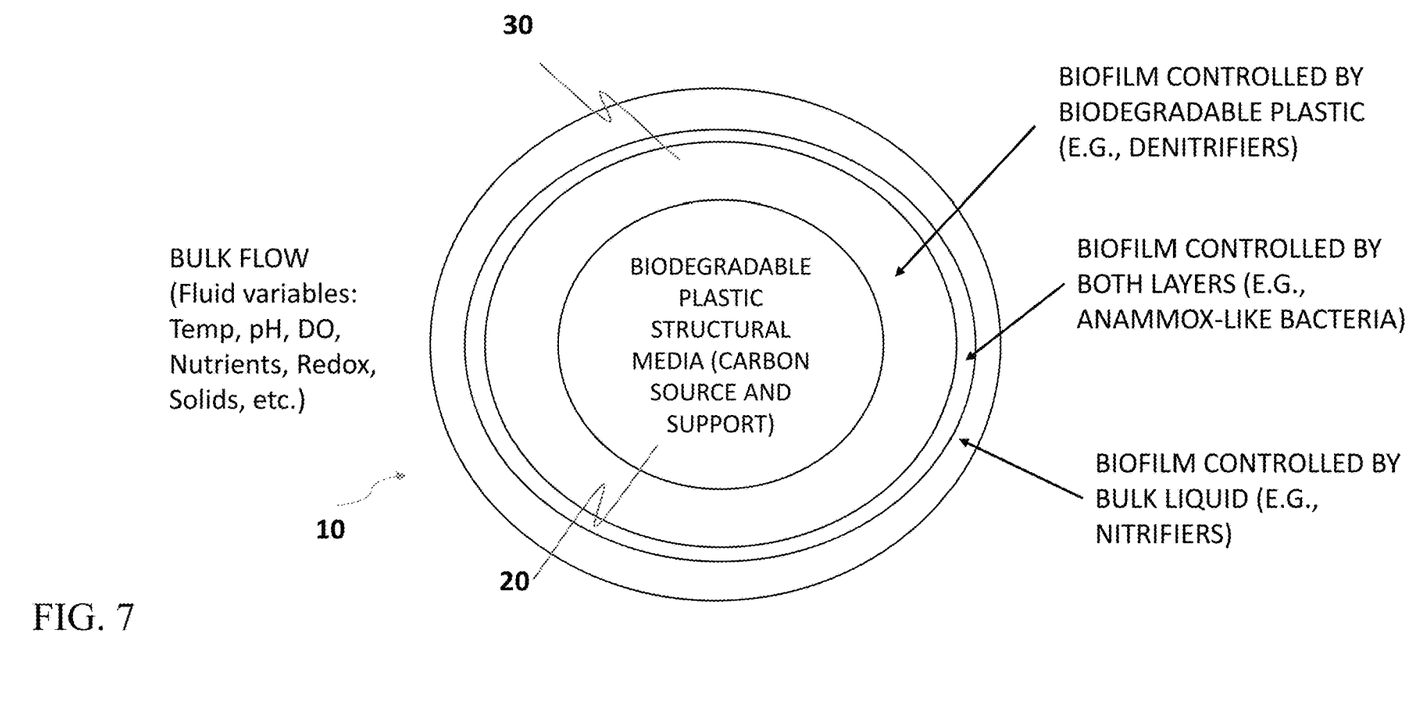
FIG. 7 shows the use of a base stratum containing a biodegradable plastic structural reactant.

FIGS. 2A to 2C depict the structural media (10) that contain strata or stratums (20), that could optionally include an inert or reactive base stratum, and one more reactive layers. The strata will support one or more biofilms (30). FIG. 2A does not contain a base stratum but has a reactive support stratum (20) and a biofilm (30) as also shown in FIG. 7 for an example embodiment. FIG. 2B contains an inert or reactive base stratum and a single reactant layer (20), and a biofilm. FIG. 2C contains a structural media (10), with base stratum with multiple reactant layers (20) and a single biofilm (30). The microorganisms are contained in the biofilm and their attachment or detachment occurs naturally or using any physical forces such as but not limited to mixing, vibration, acoustics or aeration. The different layering approaches for structural media and biofilm stratums including base stratum (either inert or reactive), including a monolayer and bilayer/multilayer of any targeted thickness (including being interlaced, comingled or integrated) that is related to its use, reactivity and desired life (its exhaustion) in the process or reactor and to have other effects in a carryover reactor or process. The base stratum (optionally by itself a reactant layer as in FIG. 2A) could also be reactive (such as biodegradable plastics, metals or silicic material), and all these reactivities could be synergistic to grow desired organisms on biofilms (30) of series or parallel functions with similar or different redox related functionalities. The reactants could be for example growth promoters and/or inhibiters, used in a manner to select for organisms, functions or morphologies. These reactions and layers could be revealed in the biological process such as the activated sludge (such as process 1, and the reactant used for the process) or a downstream process (such as process 2, and a reactant used for the process). A single reactant can be used for multiple processes and multiple reactants can be used for a single process. Downstream process (such as process 2) could occur in the liquid or solids stream depending on the migratory destination of the structural media. A physical selector could remove or direct the structural media to downstream process. The selector could be a mainstream solid-liquid or solid-solid separator that is inline to the process or an external physical selector in the waste stream.

Figure 3:
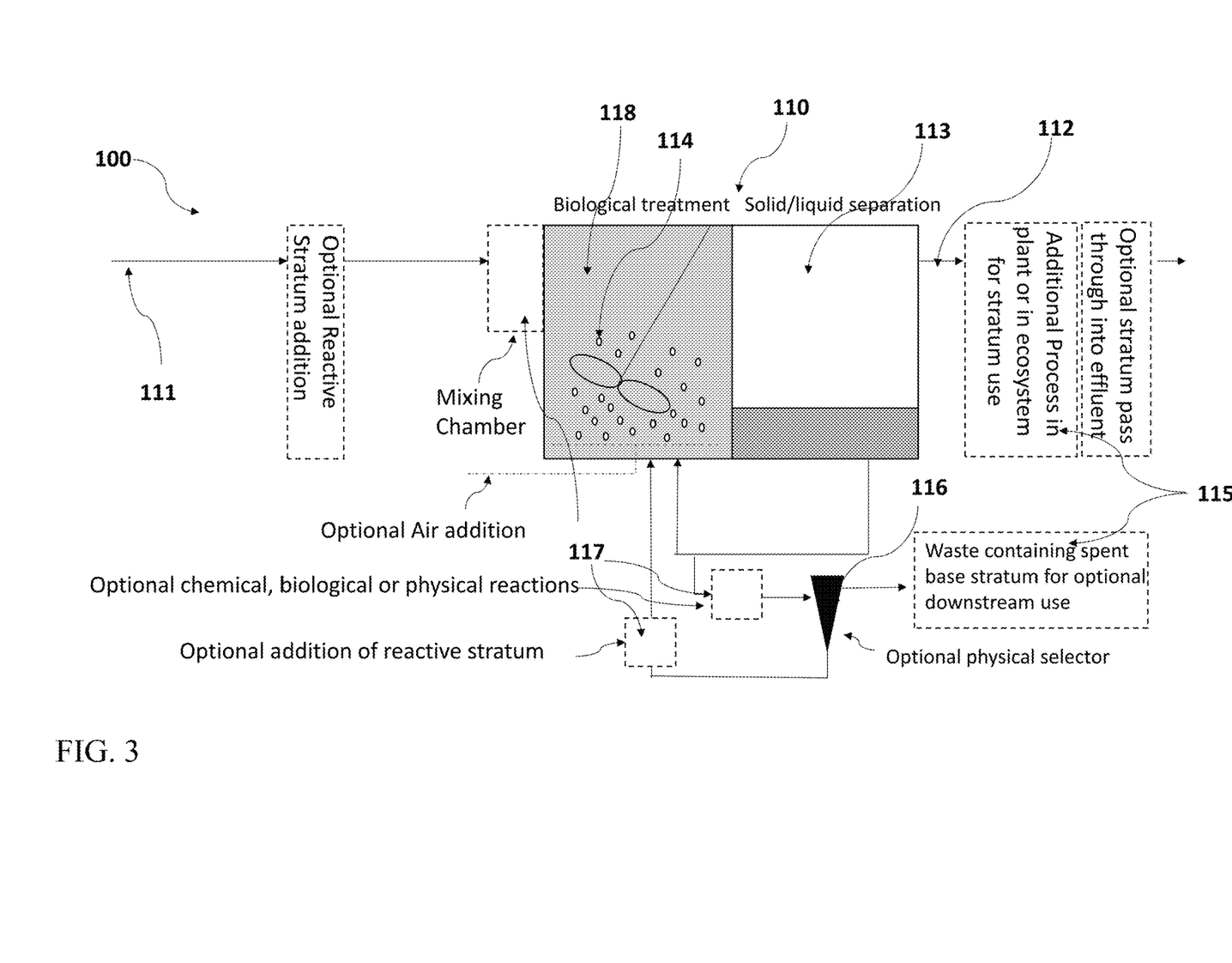
FIG. 3 represents application options for the proposed apparatus/process as a suspended biological treatment step with a solids liquid separation based on settling or clarification as applied to water reclamation, water or biosolids reuse or drinking water production.

FIG. 3 represents application options for the proposed biological reactor or process (100) as a suspended biological treatment (example embodiment), with an inlet (111) and an outlet (112), that includes a reactor tank(s), zone or multiple zones, separated in reaction space or reaction time (118), and a solids liquid separation (113) based on settling or clarification or floatation or filtration (single or multiple in series or parallel), as applied to an industrial manufacturing process, water reclamation, water or biosolids reuse or drinking water production. The 'loose' biofilm base stratum (114) can be applied optionally in the influent (111), directly into the biological reactor/process, or directly in a recycle stream, or using chamber(s) (117) located anywhere, in the inlet, outlet, or associated with recycles, for either mixing or reaction, or located anywhere within the context of the reactor or the separator. The chambers can provide mixing and/or additional reactive conditions or functions (including physical, chemical or biological reactions). The stratum could be applied as loose media (114) mixed into the process, or as modules, in cassettes, cages or other approaches that could allow for the media to be periodically recharged upon sufficient or full exhaustion. An example is to use hanging textiles, ropes, lace, that are placed in cassettes, or any approach that manages media surface area and biofilm thickness. Mixing energy may be required to manage mass transfer resistance and thickness of biofilms on these fixed or moving structural media. The solid liquid separator (113) or the optional physical selector (116) is used as an approach to determine the media exhaustion, especially if the loose media is applied into the process. The physical selector (116) can be applied anywhere in the process to manage the wasting (removal) including directly in the reactor or in the underflow of a separator thus maintaining the solids residence time of media between 1 day and 10000 days. A downstream filter could be used as part of a two-step solid liquid separator (113) in conjunction for example with a clarifier to manage the selective removal of the media that escapes the clarifier but is retained by the filter. Thus, multiple selectors and separators can be used in series or parallel to achieve the retention or removal of structural media for disposition or to send to a downstream process (115) for additional reactivity or for use as structural support. The additional process (115) in plant or in ecosystem could be any natural or constructed processes including additional liquid or solids (as described in FIG. 6) reactors or processes. The chamber, the location for stratum addition or chamber for additional reactivity could be used interchangeably at any location associated with the biological reactor.

Figure 4:
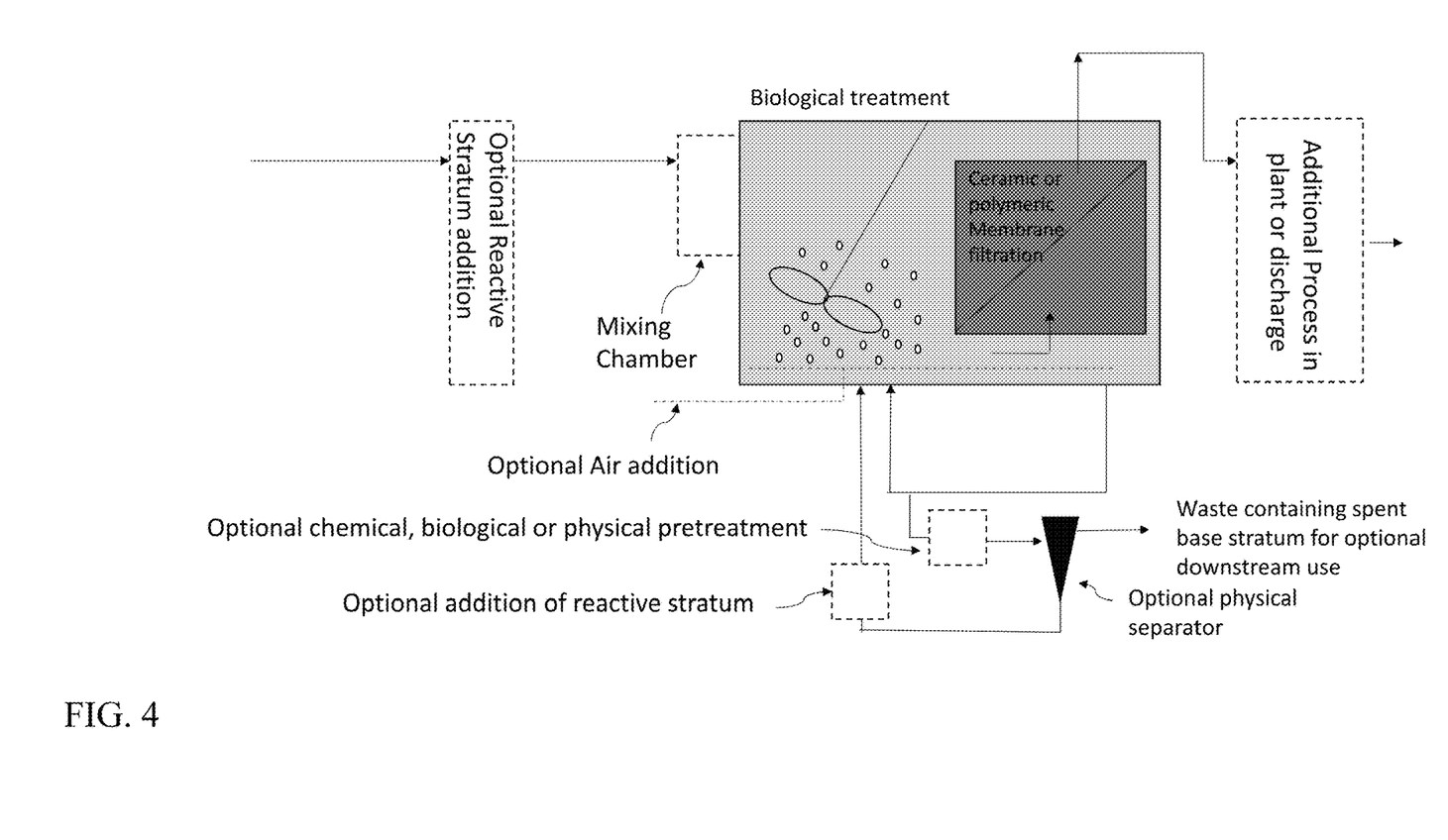
FIG. 4 represents application options for the proposed apparatus/process as a suspended biological treatment step with a solids liquid separation based on membrane separation as applied to water reclamation, water or biosolids reuse or drinking water production.
Figure 6:
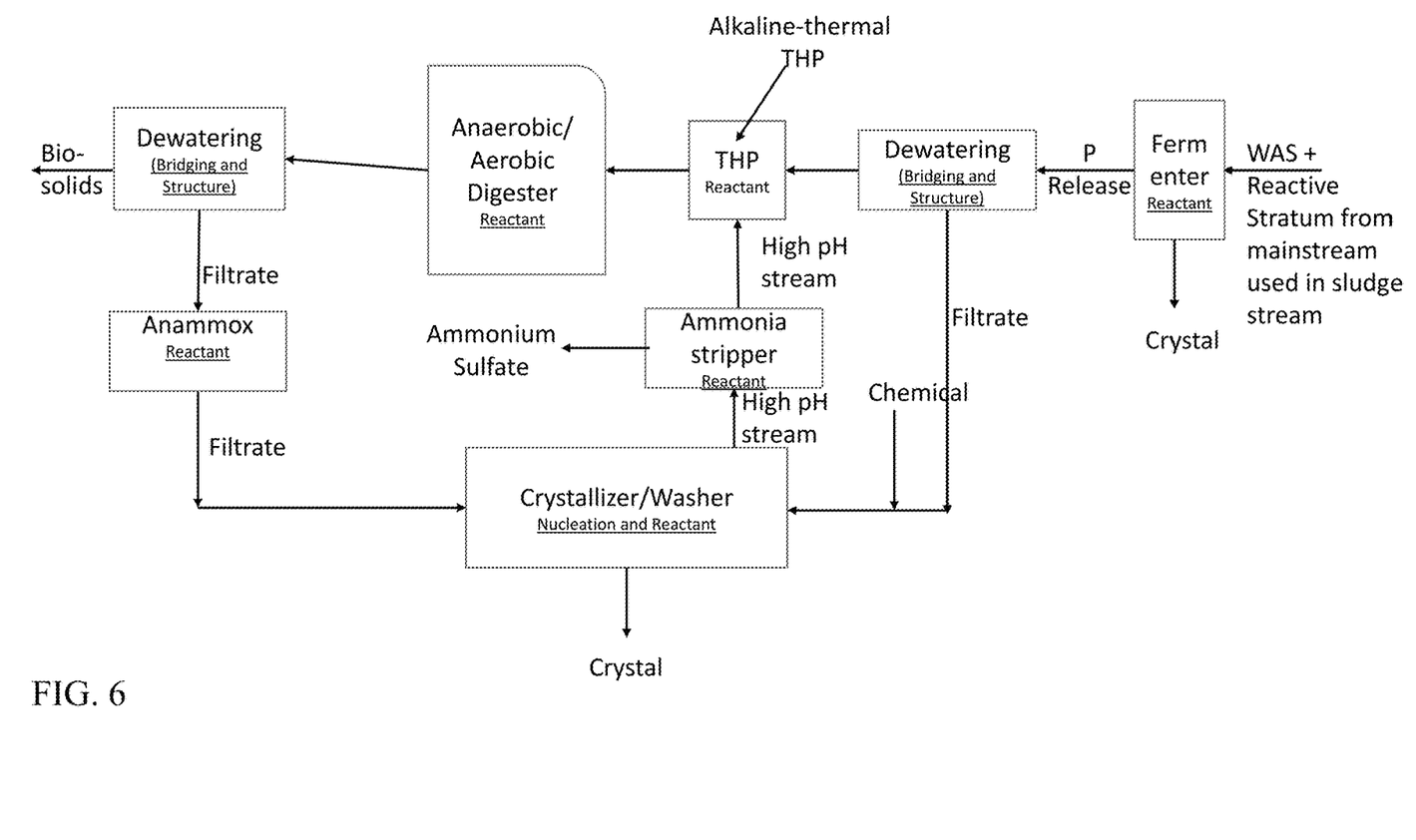
FIG. 6 represents various optional downstream solids processes where the base stratum can be used for additional reactivity or realized benefits including a fermenter, crystallizer, thickening, dewatering, digestion, thermal hydrolysis and/or side stream treatment.

FIG. 4 represents application options similar to FIG. 3 for the proposed biological reactor/process as a suspended biological treatment example embodiment, excepting the replacement of a solid liquid separation based on membrane separation as applied to water reclamation, water or biosolids reuse or drinking water production (all else is similar in description to FIG. 3. The biofilm base stratum can be applied optionally in the inlet, directly into the biological process or using a chamber, or directly in the recycle stream or anywhere within the context of the reactor or the separator. The chambers can provide mixing or additional reactive conditions or functions (including physical, chemical or biological reactions). The stratum could be applied as loose media mixed into the process, or as modules, cassettes, cages or other approaches that could allow for the media to be periodically recharged upon sufficient or full exhaustion.

The solid liquid separator or the optional physical selector is used as an approach to determine the exhaustion, if the media is applied directly into the process. The physical selector can be applied anywhere in the process to manage the wasting including directly in the reactor or in the underflow of a separator. Thus, multiple selectors and separators can be used in series or parallel to achieve the retention or removal of structural media for disposition or to send to a downstream process for additional reactivity or for use as structural support. The additional process in plant or ecosystem could be any natural or constructed processes including additional liquid or solids (as described in FIG. 6) processes. The chamber, the location for stratum addition or chamber for additional reactivity could be used interchangeably at any location associated with the biological reactor.

Figure 5:
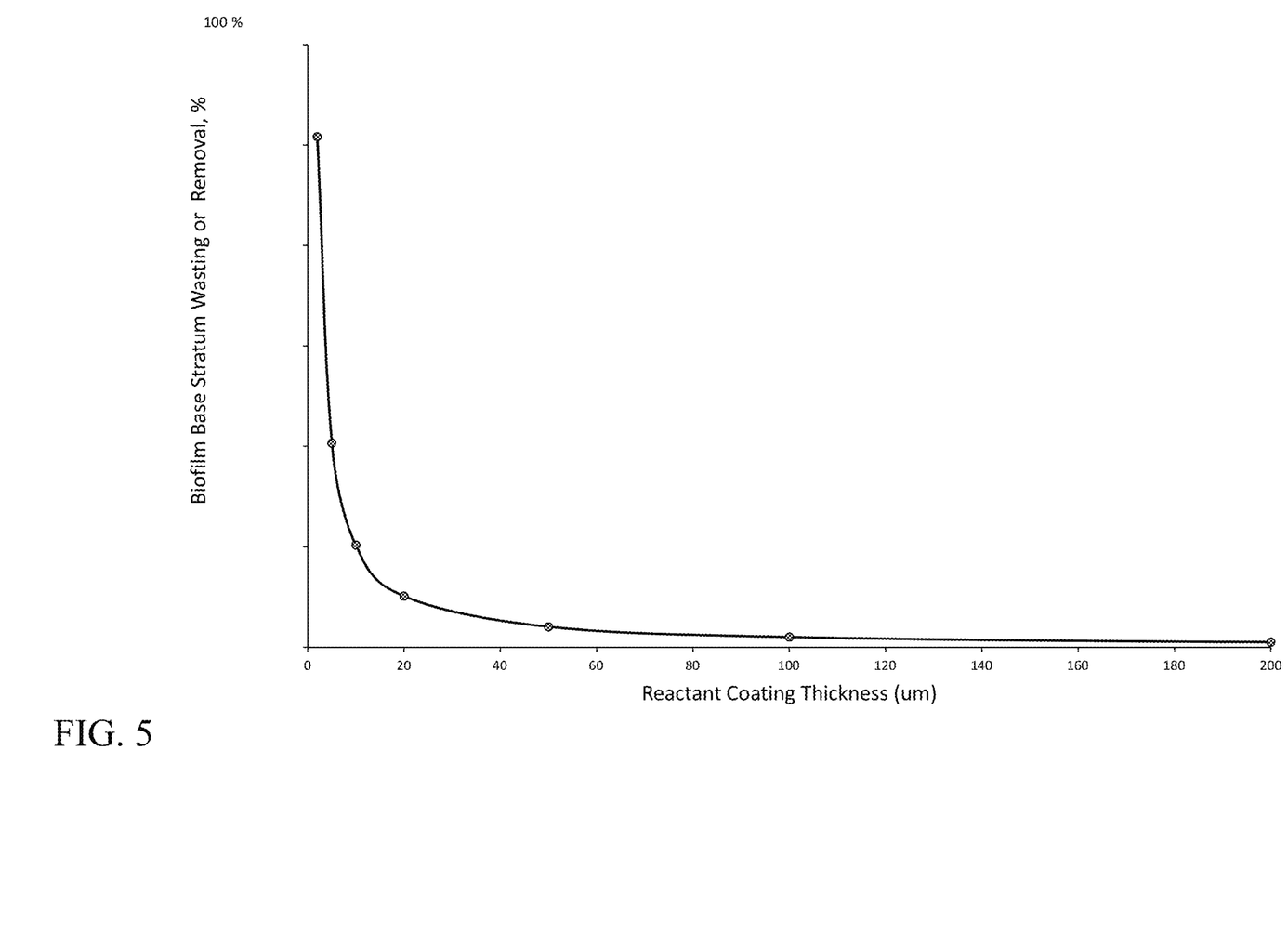
FIG. 5 shows an example representation of the impact of decreasing thickness of the structural reactive base stratum (as it gets consumed) on its wasting or removal from the treatment system.

FIG. 5 shows an example representation of the impact of decreasing thickness of the reactive base stratum (as it gets consumed) on its wasting or removal from the treatment system. In this example, the stratum is retained in the system up to a certain thickness, and as it gets sufficiently thinner, it is removed using a physical separator/selector. The removal can occur based on any x-axis parameter including, but not limited to, thickness, size, volume, surface area, density or any changing characteristics of the media or stratum. The representation shows one possibility of removal efficiency pattern. Other patterns are also possible of any shape of a line described within the two axes shown in the figure.

FIG. 6 represents various optional downstream solids processes where the base stratum can be used for additional reactivity or realized benefits including from right to left, a fermenter, thickening or dewatering process, a thermal hydrolysis process (THP), an anaerobic or aerobic digestion process, a dewatering process. Crystallizer, stripper, washer and anammox side stream treatment processes are also shown. The location of each process can be interchanged or a process can be entirely skipped. Thermal processes (not shown), such as bio-drying, drying, pyrolysis, gasification, carbonization, liquefaction or solid digestion could be other processes for consideration for downstream use of stratum. The reactions could entail improved performance of these processes or reactors using either the residual reactivity of a single or multiple layers or from the use of the base stratum itself. A physical separator or selector could be employed to remove the stratum or a realized product.

FIG. 7 shows the use of a structural media (10) similar to FIG. 1, in this case made of biodegradable plastic, that is the base stratum, thus containing by itself a biodegradable plastic structural reactant. The biodegradable plastic (20) as an example embodiment can be either moulded, extruded or printed or produced in any manner possible and of any size, shape or density that could help with its reaction, mixing or selection. Multiple biofilms (30), inner, middle and outer layers are shown that are either controlled by the structural media, controlled by inner and outer biofilm layers (or their products) or redox conditions, as a symbiosis approach, and an outer biofilm that is controlled by the bulk liquid. The biofilms can be of any shape, structure, or thickness. They can be intermingled and integrated into each other. The layers are shown only as a schematic representation and an example embodiment. Upon its completed use or sufficient exhaustion, the stratum could be removed physically or optionally by a separator or selector. The reactivity could be increased or decreased using a physical, chemical or biological reaction approach external to (such as shown in FIG. 3) or within the structural media (such as using heat, or other co-reactants). The key to sustainable action is to manage the physical forces to supply it to the process for reaction, retain it in the process, to manage its biodegradation, to manage its removal, to obtain further downstream reuse or to recharge it. The physical feature, size and shape can be varied to be a part of a biofilm, or for the biofilm to be entrained in the plastic. One could have microbial communities directly controlled by the plastic stratum, microbial community controlled by the stratum and the base community, or microbial community reliant on the bulk liquid as shown in the figure. These communities could be synergistic and take advantage of co- or counter-diffusion of substrates. The production of greenhouse gases could be addressed by such management of substrates and/or micro-organisms. The wastewater or reactor fluid characteristics could help with such reactivity.

Figure 8:
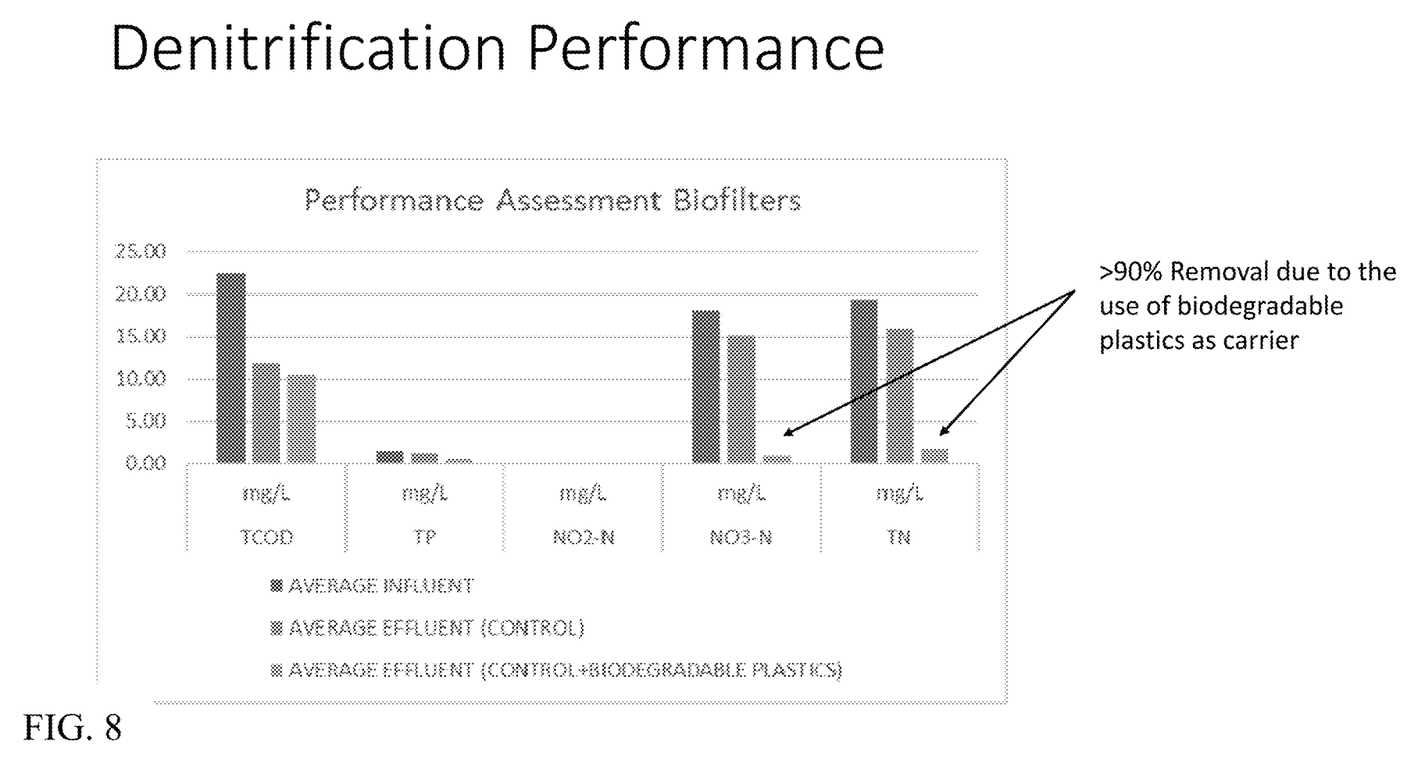
FIG. 8 shows the use of biodegradable plastics surface reactant as a carbon source for denitrification and phosphorus removal.

FIG. 8 shows the use of biodegradable plastics surface reactant as a carbon source for denitrification and phosphorus removal. This includes the use of such materials by organisms such as but not limited to denitrifying polyphosphate accumulating organisms, or as a co-substrate for micropollutant degradation. The material could become a host for reactions such as partial denitrification with anammox, with relevant organisms grown on such surfaces. Growth of any autotroph or heterotroph is possible on such biodegradable plastics, in a way to create relevant synergies or symbiosis associated with co- or counter diffusion of substrates. The type of biodegradable particles containing volatile fatty acids, such as propionic acid, which can selectively favor the growth of phosphorus accumulating organisms, glycogen or polyhydroxyalkanoate or other carbon storing organisms. Any specific organism can be used for any purpose in the use of such plastics as a carbon source as well as a structural stratum.

FIG. 3 and FIG. 4 can also include cassettes or cages containing such media in the biological treatment zone.

The terms "including," "comprising" and variations thereof, as used in this disclosure, mean "including, but not limited to," unless expressly specified otherwise.

The terms "a," "an," and "the," as used in this disclosure, means "one or more", unless expressly specified otherwise.

It is noted that in this specification, wherever a description is provided in terms of thickness associated with a biofilm, the term applies equally to a biofilm mass, biofilm volume, or a biofilm density, but the dimensions of mass, volume or density will need to be appropriately proportioned, as understood by those skilled in the pertinent art. Any implementation of a biofilm can include arrangements of two or more biofilms arranged in series, in parallel, in tributary (for example, where additional flows such as a bioaugmentation, co-substrate, or micronutrient are added to a downstream reactor) or in distributary (for example, where flow from one reactor is distributed into two or multiple parallel reactors) configurations.

The term "approach," as used in this disclosure, means "a method or a process," unless expressly specified otherwise.

The term biological reactor is typically an apparatus that perform biological reactions, within a biological process. The reactions can be for any purpose including treatment, reclamation or production. Wastewater treatment and water reclamation can be used interchangeably.

Values expressed in a range format can be interpreted in a flexible manner to include not only the numerical values explicitly recited as the limits of the range, but also to include all the individual numerical values or sub-ranges encompassed within that range as if each numerical value and sub-range is explicitly recited. For example, a concentration range of "about 0.1% to about 5%" can be interpreted to include not only the explicitly recited concentration of about 0.1 wt. % to about 5 wt. %, but also the individual concentrations (for example, 1%, 2%, 3%, and 4%) and the sub-ranges (for example, 0.1% to 0.5%, 1.1% to 2.2%, and 3.3% to 4.4%) within the indicated range. The statement "about X to Y" has the same meaning as "about X to about Y,"" unless indicated otherwise. Likewise, the statement "about X, Y, or about Z" has the same meaning as "about X, about Y, or about Z," unless indicated otherwise.

The term "wastewater," as used in this disclosure, means "water or wastewater," or "industrial wastewater," or "substrate," unless expressly specified otherwise.

The term "treatment," as used in this disclosure, also means "reaction," unless expressly specified otherwise.

The term, "media", "support", "structural support", "stratum" can be used interchangeably. These support media can be both inert or reactive based on needs. The term "strata" and "stratums" can also be used interchangeably.

All claimed features are included in the specifications as below:

An apparatus (100) comprising:
a biological reactor (110) with an inlet (111) and an outlet (112), for employing a structural media (10) having a single, multiple or layered strata (20) that are fixed, suspended or moving, and carrying a single or multiple biofilms (30) of single or multiple solids residence times for the selective growth of organisms or for the removal of carbonaceous material, nutrients, inorganic compounds and/or micro-pollutants in a suspended growth process, wherein the structural media (10) is fixed, suspended or moving along with the single or multiple biofilms,
wherein a use (117), reaction (118), retention in the biological reactor (110), separation (113), selection (116) or removal (115) of the structural media (10) is based on the physical characteristics of the structural media (10) that allow for the use, reaction, retention, separation, selection or removal.

The apparatus as cited above, wherein the structural media (10) comprises at least one of:
a. inorganic or organic materials or made with inorganic carbon; or
b. silica or silicic materials; or
c. metallic materials comprising one or more of potassium, calcium, magnesium, nickel, cobalt, iron, aluminum, copper, manganese, molybdenum or zinc; or
d. biodegradable plastics; or
e. recovered byproducts of wastewater or wastewater treatment process including both organic and inorganic inert or reactive materials; or
f. metallic material is used as an intracellular or extracellular reactant for oxidation, reduction, electron transport, charge balancing or charge bridging.

The apparatus as cited above, wherein the single or multiple biofilm (30) comprises at least one of a bacteria, archaea or eukaryotes including algae or protists.

The apparatus as cited above, wherein the structural media (10) is configured to further employ in downstream processes for additional reactions including:
a. within a sludge stream comprising either one or more of fermentation, crystallization, digestion, thermal hydrolysis, stabilization, stripping, thickening or dewatering, drying, thermal process, or beneficial reuse is in agriculture; or
b. within a liquid stream; or c. in a constructed process or a natural system comprising one or more of a wetland, a green infrastructure, a lagoon or a reservoir; or d. in the ecosystem such as a lake, river, estuary, bay or a marine environment The apparatus as cited above, wherein the single or multiple biofilms are retained in the structural media (10) at a higher solids residence time than a bulk suspended or fixed growth of the biological reactor (110), the media or biofilm life varying in a range between 1 day and 10000 days.

The apparatus as cited above, wherein the structural media (10) is manufactured using deposition of reactant on a solid phase, or by a three-dimensional (3D) printing, moulding, extruding, baking, coating, caking, sedimenting or impregnating.

The apparatus as cited above, wherein the structural media (10) are contained in an industrial wastewater treatment reactor, a high rate and contact stage, bioadsorption reactor, an activated sludge reactor, a biofilm reactor, or a micropollutant biodegradation reactor that is used for water reclamation, or for producing potable or reuse water or for industrial manufacturing.

The apparatus as cited above, wherein the physical characteristics of the structural media (10) are any value between:
a. 10- and 10000-microns size for retention; or
b. 0.9 and 6.5 specific gravity for retention; or
c. 0.9 and 1.2 specific gravity for use and reactivity; or
d. 10 and 1000 m2/m3 specific surface area for use and reactivity.

The apparatus as cited above, wherein the physical characteristics of the structural media (10) are configured to allow the structural media (10) removal using the selection (116) or separation (113) comprising one of a weight-based selector, a size-based selector, or a compressibility-based selector, or a shear based selector, including one of a lamella, a settling tank, a hydro-cyclone, a centrifuge, a classifier, a mesh, a screen, a sieve, a filter, a membrane, when the structural media has a change in:
a. density any value varying from 0.05 to 1.0 g/ml; or
b. particle size, any value varying from 10 and 1000 microns.

A method comprising:
a biological process that reacts or treats a flow, and employing a structural media (10) having a single, multiple or layered strata that are fixed, suspended or moving, and carrying a single or multiple biofilms (30) of single or multiple solids residence times for the selective growth of organisms or for the removal of carbonaceous material, nutrients, inorganic compounds and/or micro-pollutants in a suspended growth process, wherein the structural media is fixed, suspended or moving along with the single or multiple biofilms, wherein the structural media (10) along with the single or multiple biofilms (30) are configured to at least:
a. improve the extracellular properties of the biofilm; or
b. improve the intracellular reactions within the microorganism; or
c. selects for the preferential growth of a microorganism or group of microorganisms; or
d. inhibits the growth of a microorganism or group of microorganisms; or
e. improves the structural characteristics within the biofilm; or
f. increases the reaction rates or confers strength or provides structure or function to a biofilm or the contained microorganism; or g. improves negative or positive charge or polar or hydrophilic or hydrophobic characteristics; or
h. provides inorganic carbon or alkalinity to manage biological reactions or substrate availability; and
wherein a use (117), reaction (118), retention in biological reactor (110), separation (113), selection (116) or removal (115) of the structural media (10) is based on the physical characteristics of the structural media (10) that allow for the use, reaction, retention, separation, selection or removal.

A method as cited above, wherein the structural media (10) comprises at least one of:
a. inorganic or organic materials or made with inorganic carbon; or
b. silica or silicic material; or
c. metallic materials comprising one or more of potassium, calcium, magnesium, nickel, cobalt, iron, aluminum, copper, manganese, molybdenum or zinc; or
d. biodegradable plastics; or
e. recovered byproducts of wastewater or wastewater treatment process including both organic and inorganic inert or reactive materials; or
f. metallic material is used as an intracellular or extracellular reactant for oxidation, reduction, electron transport, charge balancing or charge bridging.

The method as cited above, wherein the single or multiple biofilm (30) comprises at least one of a bacteria, archaea or eukaryotes including algae or protists.

The method as cited above, wherein the structural media (10) is configured to further employ in downstream processes for additional reactions including:
a. within a sludge stream comprising either one or more of fermentation, crystallization, digestion, thermal hydrolysis, stabilization, stripping, thickening or dewatering, drying, thermal process, or beneficial reuse is in agriculture; or
b. within a liquid stream; or
c. in a constructed process or a natural system comprising one or more of a wetland, a green infrastructure, a lagoon or a reservoir; or
d. in the ecosystem such as a lake, river, estuary, bay or a marine environment.

The method as cited above, wherein the single or multiple biofilms are retained in the structural media (10) at a higher solids residence time than a bulk suspended growth of the biological reactor (110), the media or biofilms life varying in a range between 1 day and 1000 days.

The method of claim 11, wherein the structural media (10) is manufactured using deposition of reactant on a solid phase, or by a three-dimensional (3D) printing, moulding, extruding, baking, coating, caking, sedimenting or impregnating.

The method as cited above, wherein the structural media (10) are contained an industrial wastewater treatment reactor, a high rate and contact stage, bioadsorption reactor, an activated sludge reactor, a biofilm reactor, or a micropollutant biodegradation reactor that is used for water reclamation, or for producing potable or reuse water or for industrial manufacturing.

The method as cited above, wherein the physical characteristics of the structural media (10) are between:
a. 10- and 10000-microns size for retention; or
b. 0.9 and 6.5 specific gravity for retention; or
c. 0.9 and 1.2 specific gravity for use and reactivity; or
d. 10 and 1000 m2/m3 specific surface area for use and reactivity.

The method as cited above, wherein the physical characteristics of the structural media (10) are configured to allow the structural media (10) removal using the selection (116) or separation (113) comprising one of a weight-based selector, a size-based selector, or a compressibility-based selector, or a shear based selector including one of a lamella, a settling tank, a hydrocyclone, a centrifuge, a classifier, a mesh, a screen, a sieve, a filter, a membrane, when the structural media has a change in:
 a. Density, any value varying from 0.05 to 1.0 g/ml; or
 b. particle size, any value varying from 10 and 1000 microns.

What is claimed is:

1. An apparatus (100) comprising: A suspended growth biological reactor (110) for water treatment, wastewater treatment or reuse with an inlet (111), an outlet (112), and a separator (113), a selector (116) coupled to the biological reactor; a downstream reactor (115) coupled to the selector (116); and a structural media (10) having a single, multiple or layered strata (20) that are fixed, suspended or moving, and carrying a single or multiple biofilms (30) of single or multiple solids residence times for selective growth of organisms or for removal of carbonacecous material, nutrients, inorganic compounds or micro-pollutants in a suspended growth process, wherein the structural media (10) is fixed, suspended or moving along with the single or multiple biofilms, wherein a physical characteristic of specific gravity of the structural media is in the range of 0.9 to 1.2 confiugred for retention so as to not be over buoyant or over heavy for improved mixing profiles and distribution within the biological reactor, and the physical characteristic is achieved through inclusion of air bubbles, pores or cavities, or weighting material, or by a three-dimensional (3D) printing, moulding, extruding, baking, coating, caking, sedimenting or impregnating in manufacturing of the structural media, and the selector (116) is configured to remove the structural media by selection or separation when the structural media has a change in density between 0.05 to 1.0 g/ml, or particle size, between 10 to 1000 microns, and direct the removed structural media of the biological reactor to the downstream reactor for downstream processing.

2. The apparatus of claim 1 wherein the structural media (10) comprises at least one of:
 a. inorganic or organic materials including plant derived or made with inorganic carbon; or
 b. silica or silicic materials; or
 c. metallic materials comprising one or more of potassium, calcium, magnesium, nickel, cobalt, iron, aluminum, copper, manganese, molybdenum or zinc; or
 d. biodegradable plastics; or
 e. recovered byproducts of wastewater or wastewater treatment process including both organic and inorganic inert or reactive materials; or
 f. metallic material is used as an intracellular or extracellular reactant for oxidation, reduction, electron transport, charge balancing or charge bridging.

3. The apparatus of claim 1 wherein the single or multiple biofilm (30) comprises at least one of a bacteria, archaea or eukaryotes including algae or protists.

4. The apparatus of claim 1, wherein the biological reactor is selected from an industrial wastewater treatment reactor, a high rate and contact stage, bioadsorption reactor, an activated sludge reactor, a biofilm reactor, or a micropollutant biodegradation reactor that is used for water reclamation, or for producing potable or reuse water or for industrial manufacturing.

5. The apparatus of claim 1, wherein physical characteristics of the structural media (10) are between: 10- and 10000-microns size for retention.

6. The apparatus of claim 1, wherein the selector is selected form one of a weight-based selector, a size-based selector, a compressibility-based selector, a shear-based selector including one of a lamella, a settling tank, a hydrocyclone, a centrifuge, a classifier, a mesh, a screen, a sieve, a filter, a membrane.

7. A method comprises steps of: introducing an influent in a biological reactor for a bilogical process for water treatment, wastewater treatment or reuse in suspended growth process; suspending a structural media in the biological reactor for reaction in the biological process, wherein a physical characteristic of specific gravity of the structural media is in the range of 0.9 to 1.2 for retention, so as to not be over buoyant or over heavy, for improved mixing profiles and distribution within the biological reactor, retaining or removing the suspended structural media by a selector based on size of specific gravity of the structural media, wherein the selector is configured to remove the structural media by selection or separation when the structural media has a change in density or specific gravity, any value varying from 0.05 to 1.0 g/ml; or particle size, any value varying from 10 to 1000 microns; and to direct the removed structural media in a downstream reactor for downstream processing; wherein the biological process that reacts or treats a flow, and employing the structural media (10) having a single, multiple or layered strata that are fixed, suspended or moving, and carrying a single or multiple biofilms (30) of single or multiple solids residence times for selective growth of organisms or for removal of carbonaceous material, nutrients, inorganic compounds or micro-pollutants in the influent, wherein the structural media (10) along with the single or multiple biofilms (30): a. improve extracellular properties of the biofilm; or b. improve intracellular reactions within a microorganism; or c. selects for the growth of a microorganism or group of microorganisms; or d. inhibits the growth of the microorganism or group of the microorganisms; or e. improves structural characteristics within the biofilm; or f. increases reaction rates or confers strength or provides structure or function to the biofilm or the microorganism; or g. improves negative or positive charge or polar or hydrophilic or hydrophobic characteristics; or h. provides inorganic carbon or alkalinity to manage biological reactions or substrate availability.

8. The method of claim 7, wherein the structural media (10) comprises:
 inorganic or organic materials including plant derived, or made with inorganic carbon; or
 silica or silicic material; or
 metallic materials comprising one or more of potassium, calcium, magnesium, nickel, cobalt, iron, aluminum, copper, manganese, molybdenum or zinc; or
 biodegradable plastics; or
 recovered byproducts of wastewater or wastewater treatment process including both organic and inorganic inert or reactive materials; or
 metallic material is used as an intracellular or extracellular reactant for oxidation, reduction, electron transport, charge balancing or charge bridging.

9. The method of claim 7, wherein the single or multiple biofilm (30) comprises at least one of a bacteria, archaea or eukaryotes including algae or protists.

10. The method of claim 7, wherein the downstream processing for addional reactions including: a. within a sludge stream comprising either one or more of fermentation, crystallization, digestion, thermal hydrolysis, stabilization, stripping, thickening or dewatering, drying or thermal process; or b. within a liquid stream; or c. in a constructed process or a natural system comprising one or more of a wetland, a green infrastructure, a lagoon or a reservoir; or d. in an ecosystem selected from a lake, river, estuary, bay or a marine environment.

11. The method of claim 7, wherein the structural media or biofilm life varying in a range between 1 day and 10000 days.

12. The method of claim 7, wherein the biological reactor is selected from an industrial wastewater treatment reactor, a high rate and contact stage, bioadsorption reactor, an actuvated sludge reactor, a biofilm reactor, or a micropollutant biodegradation reactor that is used for water reclamation, or for producing potable or reuse water or for industrial manufacturing.

13. The method of claim 7, wherein physical characteristics of the structural media (10) are any a value between: 10- and 10000-microns size for retention.

14. The method of claim 7, wherein the selector is selected form comprising one of a weight-based selector, a size-based selector, a compressibility-based selector, a shear-based selector including one of a lamella, a settling tank, a hydrocyclone, a centrifuge, a classifier, a mesh, a screen, a sieve, a filter, a membrane.

* * * * *